(12) United States Patent
Perkins et al.

(10) Patent No.: US 11,536,165 B1
(45) Date of Patent: Dec. 27, 2022

(54) HYDRAULIC LASH ASSEMBLY AND VALVETRAIN IMPLEMENTING SAME

(71) Applicant: Southwest Research Institute, San Antonio, TX (US)

(72) Inventors: Anthony Perkins, Shoreham-by-Sea (GB); Riccardo Meldolesi, Hove (GB); Clive Lacy, Worthing (GB); Dustin Kramer, Helotes, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 0 days.

(21) Appl. No.: 17/573,670

(22) Filed: Jan. 12, 2022

(51) Int. Cl.
| | |
|---|---|
| *F01L 1/24* | (2006.01) |
| *F01L 13/06* | (2006.01) |
| *F01L 1/18* | (2006.01) |
| *F01L 13/00* | (2006.01) |
| *F01L 1/46* | (2006.01) |

(52) U.S. Cl.
CPC ............ *F01L 1/2416* (2013.01); *F01L 1/185* (2013.01); *F01L 1/2405* (2013.01); *F01L 13/06* (2013.01); *F01L 1/46* (2013.01); *F01L 2001/186* (2013.01); *F01L 2013/001* (2013.01)

(58) Field of Classification Search
CPC ... F01L 1/185; F01L 2001/186; F01L 1/2405; F01L 1/2416; F01L 1/46
USPC ..................... 123/90.2, 90.43, 90.44, 90.46
See application file for complete search history.

(56) References Cited

U.S. PATENT DOCUMENTS

| | | | |
|---|---|---|---|
| 7,765,972 B2 * | 8/2010 | Hofbauer ............ | F01L 13/0021 123/90.39 |
| 8,534,250 B2 | 9/2013 | Meldolesi et al. | |
| 2012/0160200 A1 * | 6/2012 | Methley .................... | F01L 1/18 123/90.46 |
| 2015/0285162 A1 * | 10/2015 | Hosoda ............... | F02D 13/0207 123/90.15 |
| 2020/0040775 A1 * | 2/2020 | Raimondi ................. | F01L 1/46 |

FOREIGN PATENT DOCUMENTS

DE  102013109414 A1 *  3/2015 ................ F01L 1/08

OTHER PUBLICATIONS

Machine Translation of DE 102013109414 A1 (Mar. 2015).*

* cited by examiner

*Primary Examiner* — Jorge L Leon, Jr.
(74) *Attorney, Agent, or Firm* — Grossman, Tucker, Perreault & Pfleger, PLLC

(57) ABSTRACT

A hydraulic lash assembly (HLA) for use in a valvetrain. The HLA preferably includes a first arm configured to transition a valve between a closed orientation and an open orientation. The first arm can include an engagement surface to receive a driving force from a timing member and to cause the valve to transition to the open orientation for a predetermined period. The HLA further preferably includes a second arm to receive a holding force from an actuator and a pivot section to couple to the first arm and displace the first arm based on the holding force from the actuator. Preferably, the first arm and the second arm form a lever arrangement whereby the pivot section of the second arm underlies and supports the first arm and allows for rotational movement of the first arm that is independent from the second arm.

18 Claims, 8 Drawing Sheets

HYDRAULIC LASH ASSEMBLY AND VALVETRAIN IMPLEMENTING SAME

TECHNICAL FIELD

This specification relates generally to internal combustion engines, and more particularly, to a hydraulic lash assembly for use within a valvetrain.

BACKGROUND INFORMATION

Within engines of vehicles and other machinery, valves such as poppet valves can be used in valvetrains to control the operation of intake and exhaust valves. Poppet valves can be actuated via a rocker arm based on a cam follower or other timing member. The clearances between a poppet valve and components such as the rocker arm can significantly impact engine performance in terms of maximum power and/or efficiency as well as overall engine lifespan. The space/gap between the poppet valve and the rocker arm, where the other components in the valvetrain are held in contact with each other without a gap, and the cam is rotated to a position where the poppet valve is closed, is referred to as lash, and is generally predetermined in order to allow for thermal expansion to occur without increased wear and/or binding of parts during operation. However, due to factors such as component age and thermal cycling, the lash can become out of tolerance and lead to, for instance, less efficient engine operation, increased wear and tear on parts, increased noise during operation, and loss of power, or to the valve never completely closing.

SUMMARY

A hydraulic lash assembly comprising a first arm configured to transition a valve between a closed orientation and an open orientation, the first arm having an engagement surface to receive a driving force from a timing member and cause the valve to transition to the open orientation for a predetermined period and a second arm to receive a holding force from an actuator and a pivot member to couple to the first arm and displace the first arm based on the holding force from the actuator. The first arm and the second arm form a lever arrangement whereby the pivot member of the second arm underlies and supports the first arm and allows for rotational movement of the first arm that is independent from the second arm to transition the valve to the open orientation based on the driving force from the timing member.

A valvetrain for use within an engine, the valvetrain comprising a housing that defines an inlet for receiving a volume of fluid and/or a volume of gas, a receiving chamber defined by the housing to receive the volume of fluid and/or the volume of gas, a valve with a closed orientation to fluidly decouple the inlet and the receiving chamber and an open orientation to fluidly couple the inlet and the receiving chamber and a hydraulic lash assembly disposed in the housing. The hydraulic lash assembly comprises a first arm configured to transition the valve between the closed orientation and the open orientation, the first arm having an engagement surface to receive a driving force from a timing member and cause the valve to transition to the open orientation for a predetermined period of time and a second arm to receive a holding force from an actuator and a pivot member to couple to the first arm and displace the first arm based on the holding force from the actuator. The first arm and the second arm form a lever arrangement whereby the pivot member of the second arm underlies and supports the first arm and allows for rotational movement of the first arm that is independent from the second arm to transition the valve to the open orientation based on the driving force from the timing member.

An expander for use within a heat recovery system, the expander comprising a housing that defines an inlet for receiving a volume of fluid and/or a volume of gas, a receiving chamber defined by the housing to receive the volume of fluid and/or the volume of gas, a valve with a closed orientation to fluidly decouple the inlet and the receiving chamber from each other, and an open orientation to fluidly couple the inlet and the receiving chamber to each other and a hydraulic lash assembly disposed in the housing. The hydraulic lash assembly comprises a first arm configured to transition the valve between the closed orientation and the open orientation, the first arm having an engagement surface to receive a driving force from a timing member and cause the valve to transition to the open orientation for a predetermined period of time, a second arm to receive a holding force from an actuator and a pivot member to couple to the first arm and displace the first arm based on the holding force from the actuator, and wherein the first arm and the second arm form a lever arrangement whereby the pivot member of the second arm underlies and supports the first arm and allows for rotational movement of the first arm that is independent from the second arm to transition the valve to the open orientation based on the driving force from the timing member.

BRIEF DESCRIPTION OF THE DRAWINGS

Various aspects and features of the present disclosure will be better understood by reading the following detailed description, taken together with the drawings wherein.

The drawings included herewith are for illustrating various examples of articles, methods, and apparatuses of the teaching of the present specification and are not intended to limit the scope of what is taught in any way.

DETAILED DESCRIPTION

The geometry of valve train components can vary over time due to, for instance, localized temperature changes leading to thermal expansion/contraction, and due to component wear during operation. These geometry changes can result in a variation of the gap between the valvetrain components. As discussed above, this gap is referred to as lash and can be measured by interposing a thin sheet of metal with a known thickness between the poppet valve and the rocker. In some applications, lash is expected to occur and will not prevent safe operation of a vehicle/engine. However, engine efficiency and power can become progressively compromised/degraded until the lash is corrected. Periodic adjustments can be utilized to correct for lash which is outside of tolerance at the expense of engine downtime and increased maintenance costs.

Figure 10:
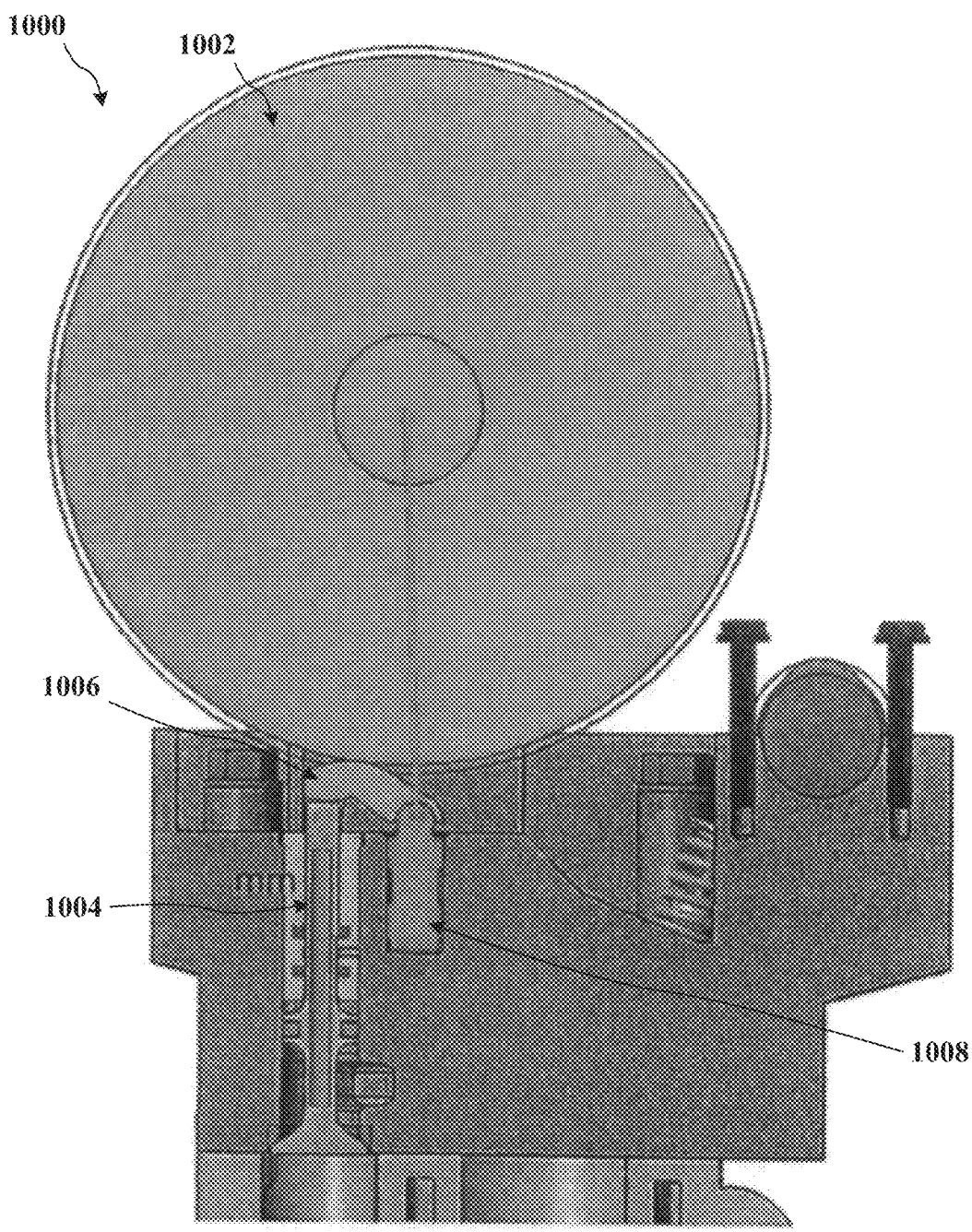
FIG. 10. shows an example of a valve train arrangement.

A hydraulic lash assembly (HLA) can be utilized to avoid the necessity of periodic lash adjustment. For example, FIG. 10 illustrates a valvetrain 1000 that includes a hydraulic lash assembly. As shown, the valvetrain 1000 includes a cam 1002, poppet valve 1004, a rocker arm 1006 (or arm) and hydraulic actuator 1008. This arrangement can also be referred to as a cam-actuated intake valve. In this example, the hydraulic actuator 1008 provides lash compensation by supplying a force to the rocker arm 1006 that causes the poppet valve 1004 to be loaded but still maintain a closed orientation. When a lobe/follower (not shown) of the cam 1002 engages the rocker arm 1006, this causes the poppet valve 1004 to be displaced and transition to an open orientation. This open orientation can permit a predetermined amount of gasses to pass through an inlet (not shown).

The hydraulic actuator 1008 therefore can be used to compensate for lash over time. The lash adjusting function is achieved by adjusting the length of the hydraulic actuator 1008 to the rocker arm 1006 over a number of operating cycles. This adjustment can be performed by increasing an amount of oil within the hydraulic actuator 1008 via a one-way check valve (e.g., a lash take-up), or by letting oil out from the hydraulic actuator 1008 through apertures/holes or leakage through gaps between components.

However, the components of the valvetrain that provide the hydraulic lash can be a significant limiting factor when it comes to engine systems that seek to operate with relatively precise intake timings, and with relatively short intake durations, e.g., intake durations in a range of 1 to 3 milliseconds. This is because the "stiffness" of the valve train is governed by the material and geometry of the components. "Stiffness" as used herein refers to the ratio of the force applied to a valve, held open by the cam lobe, versus the overall movement of the valve. Theoretically, a perfectly stiff/rigid valvetrain (i.e., having a ratio of 1.0) will synchronously transfer 100% of the actuation force from the cam to a valve without delay such that at the moment the cam supplies X % of maximum force to a valve, the valve synchronously transitions/moves an equivalent distance. For example, at the moment the cam 1002 supplies 100% of a maximum force to actuate the poppet valve 1004 in a perfectly rigid valve train, the poppet valve 1004 is synchronously/instantaneously transitioned to the (fully) open orientation.

However, each intake cycle (e.g., each transitioning of the poppet valve 1004 between the closed and open orientation, and vice-versa) includes inertia forces being applied and stress being introduced at contact points including at a stem of the poppet valve 1004 that is in contact with the rocker arm 1006, at the pivot point of the rocker arm 1006, and at the location where the hydraulic actuator 1008 engages the rocker arm 1006. Given that components cannot be made perfectly rigid, these forces generate deflection in potentially each of the components and result in cumulative latency between when the lobe applies a force to the rocker arm 1006 and the poppet valve 1004 transitioning to the open orientation. For example, the deflection/deformation can result in shortening of a valve stem of the poppet valve 1004, bending/warping of the rocker arm 1006, deformation/deflection of a portion of the housing of the valve train that underlies and supports the rocker arm 1006, bending/deflection of a shaft that drives the cam 1002 (also known as a camshaft), and/or bending/deflection of a portion of the cylinder head that supports the camshaft. The magnitude of the effect of these deflections is based on the geometry and material composition of each component, as well as the speed and forces supplied during movements. In addition, the hydraulic actuator 1008 operates based on oil amounts/volume, as discussed above, with oil having a bulk modulus that further reduces overall stiffness due to inherent compressibility. This is further reduced by any air present within the oil (aeration). Bulk modulus, e.g., the change in volume of a cube of oil, as a result of uniform pressure applied thereto is far less than the corresponding bulk modulus for materials such as steel.

There exists a need to increase the required stiffness of the lash adjusting function of a valvetrain to achieve greater engine control and efficiency without the removal of lash compensation components.

Thus, an aspect of the present disclosure includes a hydraulic lash assembly that includes a plurality of rocker arms, referred to herein as arms, that are arranged in a manner that multiplies the effective hydraulic stiffness of the hydraulic lash assembly to achieve relatively short intake cycles (e.g., in a range of 1 to 3 milliseconds).

An intake cycle as used herein refers to an overall period of time between when a valve is transitioned to an open orientation to permit intake of a volume of fluid and/or gas and when the valve is transitioned to a closed orientation, with the closed orientation preferably preventing intake of any fluid and/or gas into a valvetrain.

A hydraulic lash assembly consistent with the present disclosure can be used in a variety of applications including within a valvetrain of a combustion engine and/or a valvetrain of a waste heat recovery system. A hydraulic lash assembly consistent with the present disclosure is particularly well suited for engine applications that use super critical fluids, e.g., super critical carbon dioxide ($sCO_2$), to cool an engine and/or recover heat from exhaust gases. Heat recovery systems that operate using super critical fluid can require a valvetrain that is significantly stiffer than what is used in existing vehicles based on simulation and empirical measurements indicating that the efficiency of the heat recovery system is inversely proportional to the duration of the intake cycle. This is because the faster that a volume of heated fluid, e.g., $sCO_2$, can be communicated into components of a heat recovery system, such as an expander, the greater the amount of energy that can be recovered/converted per cycle/stroke.

As generally referred to herein, super critical in the context of a fluid refers to a state where the fluid is held at or above its associated critical temperature and critical pressure. For example, $sCO_2$ behaves as a super critical fluid above a critical temperature of 304.13K (31 degrees Celsius/87.8 degrees Fahrenheit) and a critical pressure of 73.8 bar (7.3773 MPa, 72.8 atm, 1070 pound per square inch (psi)).

In one specific, non-limiting example a hydraulic lash assembly is disclosed. The hydraulic lash assembly includes a first arm configured to transition a valve between a closed orientation and an open orientation. The first arm can include an engagement surface to receive a driving force from a timing member (preferably comprising a cam and lobe) and to cause the valve to transition to the open orientation for a predetermined period of time. The first arm preferably includes a pivot joint opening that receives a protruding pivot member on the second arm. Accordingly, the hydraulic lash assembly preferably includes a second arm to receive a holding force from an actuator and a protruding pivot member to couple to the first arm pivot joint opening and operate to displace the first arm based on the holding force from the actuator. Preferably, the first arm and the second arm form a lever arrangement whereby the protruding pivot member of the second arm underlies and supports the first arm and allows for rotational movement of the first arm that is independent from the second arm. Thus, the first arm can cause the valve to transition to the open orientation based on the driving force from the timing member without requiring movement of the second arm. In the absence of the driving force, the second arm preferably supplies the holding force from the actuator to the valve via the first arm for lash compensation. The lash compensation can be configured to cause zero-lash (e.g., direct contact between the first arm and the valve).

Figure 1:
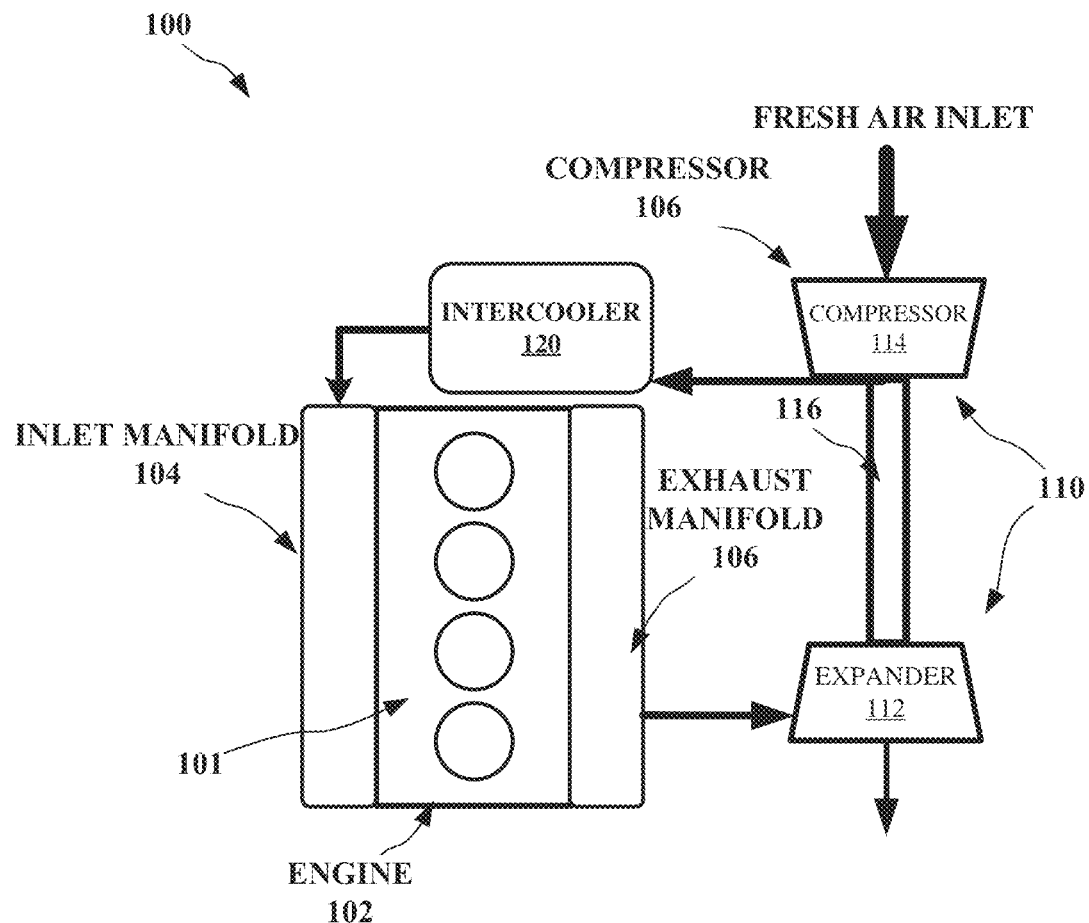
FIG. 1 shows an example internal combustion engine coupled to a heat recovery arrangement consistent with the present disclosure.

Turning to the Figures, FIG. 1 shows an engine system 100 that includes an engine 102 coupled to waste heat recovery arrangement, which may also be referred to herein as a heat recovery arrangement. The engine 102 can include a plurality of combustion chambers 101, an inlet manifold 104 disposed adjacent a first side of the combustion chambers 101 and an exhaust manifold 106 disposed adjacent a second side of the combustion chambers 101. The waste heat recovery arrangement 110 can include an expander 112, a compressor 114, and a shaft 116 extending between the expander 112 and the compressor 114.

The expander 112 can include an inlet fluidly coupled to an outlet of the exhaust manifold 106 to receive a volume of gas and/or fluid from the same. In one example, the expander 112 can be configured to receive exhaust gases to drive the shaft 116. The compressor 114 can include an outlet coupled to intercooler 120 (e.g., a radiator) to provide air into inlet manifold 104 generated by rotation of shaft 116.

Figure 2:
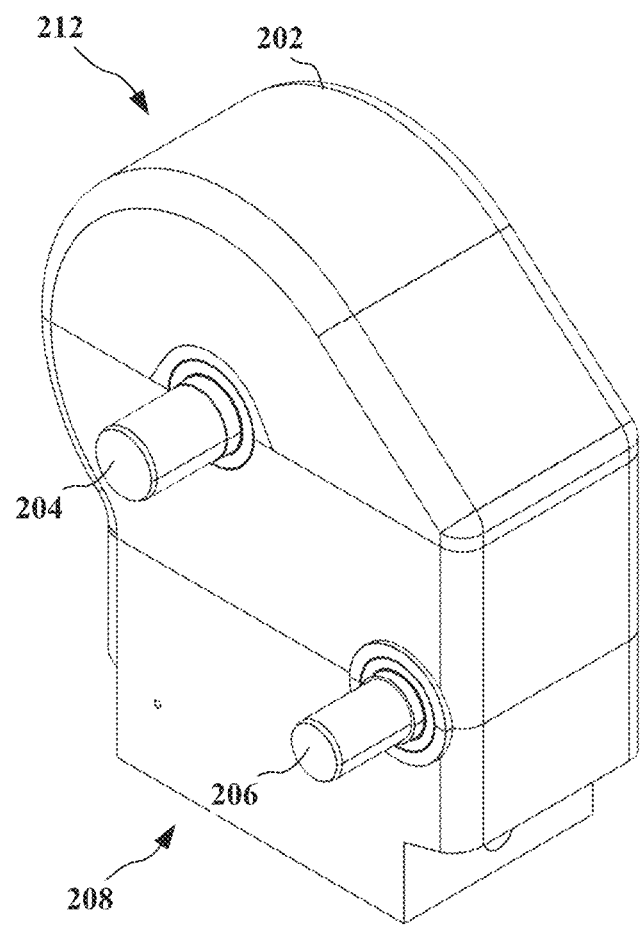
FIG. 2 shows an example expander consistent with the present disclosure that is suitable for use within the heat recovery arrangement of FIG. 1.

FIG. 2 shows an example expander 212. The expander 212 can be used to implement the expander 112 of FIG. 1. As shown, the expander 212 includes a cover 202. Preferably, the expander is capable of withstanding pressures of at least 2000 psi and preferably pressures in a range of 2000-5000 psi to allow for the communication of a super critical fluid, e.g., sCO2. In one example, the first material of the housing 202 comprises a metal such as cast iron although other materials such as aluminum are within the scope of this disclosure. The expander 212 can include a first shaft 204 and a second shaft 206 that extend into a cavity 211 (see FIG. 3). The first shaft 204 can be coupled to a timing member, as discussed in greater detail below. The second shaft 206 can be coupled to a timing member. A mounting section 208 can be configured to couple to a cylinder housing, an example of which is discussed in further detail below.

Figure 3:
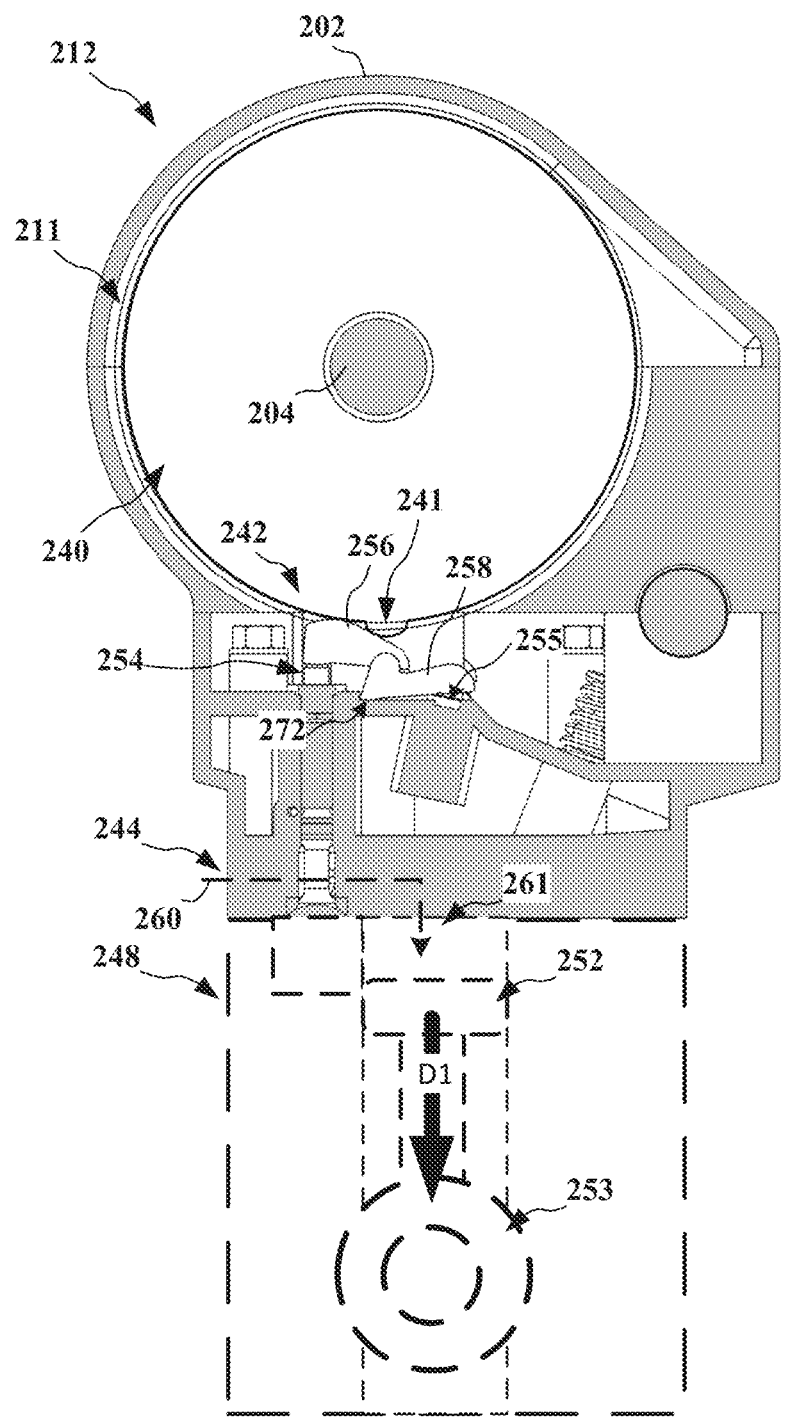
FIG. 3 shows a cross-sectional view of the expander of FIG. 2, in accordance with aspects of the present disclosure.
Figure 4:
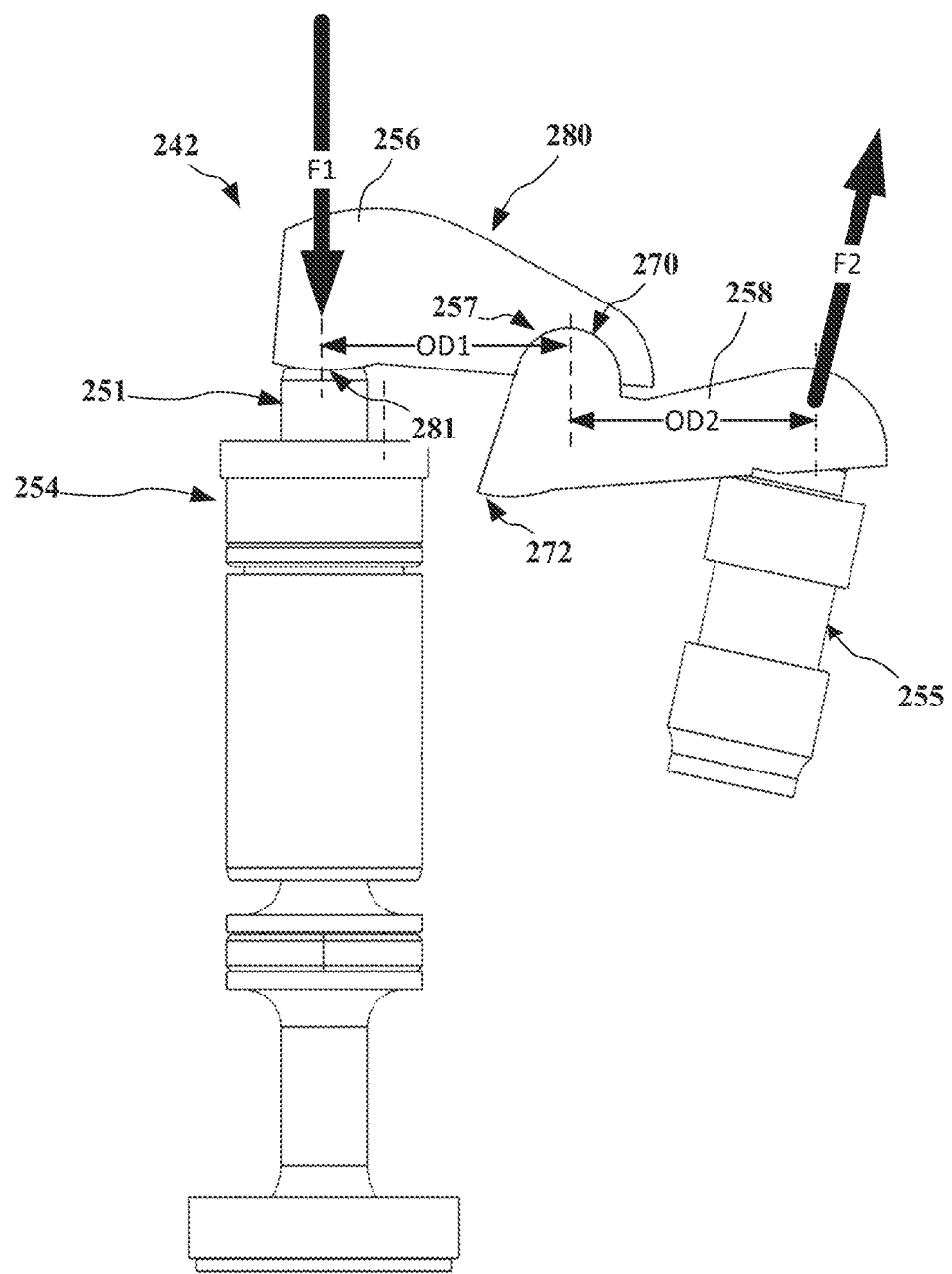
FIG. 4 shows an example hydraulic lash assembly consistent with the present disclosure in isolation.

FIG. 3 shows a cross-sectional view of the expander 212 consistent with aspects of the present disclosure and will be discussed with reference to FIG. 4. FIG. 4 shows a hydraulic lash assembly 242 in isolation for purposes of clarity.

As shown in the example of FIG. 3, the housing 202 defines a cavity 211. A timing member 240 is preferably disposed in the cavity 211. The timing member 240 is preferably coupled to the first shaft 204. More preferably, the timing member 240 is securely coupled to the first shaft 204 such that movement/rotation of the same causes movement/rotation of the timing member 240.

In the example of FIG. 3, the timing member 240 is implemented as a cam with a lobe 241 that is configured to rotate based on rotation of the first shaft 204. The lobe 241 extends from the cam to a predetermined distance and is configured to displace a first arm 256 of the hydraulic lash assembly 242 as discussed in further detail below.

The hydraulic lash assembly 242 is preferably disposed in the cavity 211, and more preferably, disposed in the cavity 211 at a location that aligns the first arm 256 with the timing member 240. The hydraulic lash assembly 242 preferably includes the first arm 256, a second arm 258, and an actuator 255. The hydraulic lash assembly 242 is preferably configured to transition a valve 254 from a closed orientation to an open orientation for a predetermined period of time (which may also be referred to herein as an intake duration). The open orientation is preferably configured to fluidly couple an inlet 244 of the housing 202 to a receiving chamber 261 and provide a fluid pathway 260. On the other hand, the closed orientation is preferably configured to fluidly decouple the inlet 244 from a receiving chamber 261 and thus disconnect/disrupt the fluid pathway 260.

The first arm 256 preferably comprises a material such as carbon or steel alloy although other materials are within the scope of this disclosure such as ceramic, silicon carbide and tungsten carbide. The first arm 256 preferably defines an engagement surface 280 (see FIG. 4) to receive a driving force from the timing member 240, and in the context of the example of FIG. 3, a driving force from the lobe 241 based on rotation of the timing member 240. The engagement surface 280 preferably includes a curved/arcuate profile to provide a ramp-like structure to engage the lobe 241 and receive the driving force. The first arm 256 further preferably defines a transfer surface 281 that is disposed opposite of the engagement surface 280. The transfer surface 281 may also be referred to herein as a valve mating surface or a valve engagement surface.

The transfer surface 281 is preferably configured to supply the driving force, e.g., from the timing member 240, along a direction generally shown as F1. In this example, the driving force may then be supplied to a valve, and more specifically, a valve stem 251 of the valve housed in the valve guide 254. The driving force supplied by the first arm 256 to the valve is preferably configured to displace the valve along a path generally shown at F1 and transition the valve to the open orientation. The driving force preferably measures in a range up to 10000 Newtons (N). The distance the valve is displaced is preferably in a range of 2 to 4 millimeters (mm). The predetermined amount of time the valve 254 is displaced, and thus by extension held in the open orientation, is preferably in a range of 1 to 3 milliseconds.

The first arm 256 further preferably defines a pivot joint opening 257 to accept a protruding pivot member. The pivot joint opening 257 can be formed as a notch, and preferably a rounded notch such as shown in FIGS. 3 and 4. The pivot joint opening 257 preferably has a center that is disposed at a predetermined offset distance OD1 from the center of the transfer surface 281. The predetermined offset distance OD1 preferably measures in a range of 15 to 25 mm.

The second arm 258 preferably defines a pivot member 270 to engage and couple with the first arm and displace the first arm based on the holding force from the actuator. That is, the pivot member can engage with the first arm so that the first arm and second arm may pivot with respect to one another, e.g. rotate with respect to one another. The pivot member 270 preferably protrudes from that second arm and engages within the pivot joint opening 257. Preferably the protruding pivot member 270 has a rounded shape. The protruding pivot member 270 is preferably configured to be at least partially received within the pivot joint opening 257 of the first arm 256. The protruding pivot member 270 is further preferably configured to (directly) engage the first arm 256 via the pivot joint opening 257 such that the protruding pivot member 270 of the second arm 258 underlies and supports the first arm 256. As discussed further below, this provides a lever arrangement that can increase the effective hydraulic stiffness of the hydraulic lash assembly 242. The protruding pivot member 270 is preferably further configured to be at least partially received within the pivot joint opening 257 to rotatably couple the first arm 256 and the second arm 258 to each other.

The second arm 258 further preferably includes a contact surface 272 adjacent to the pivot member 270. The contact surface 272 is preferably configured to (directly) engage a sidewall within the housing 202 (See FIG. 3). The contact surface 272 provides a fulcrum for the lever arrangement via the first arm 256 and the second arm 258, as discussed below.

The second arm 258 further preferably includes an actuating section 259 (see FIG. 9) to receive a holding force from an actuator 255. The actuating section can include a recess to receive a head/plunger of the actuator 255. The actuator 255 is preferably configured to provide a holding force that can vary in a range of 50 N to 250 N, for instance. The holding force may also be referred to as a lash adjustment force.

The actuator 255 can include an oil reservoir (not shown) to selectively establish the particular amount of holding force to supply to the actuating section 259. The actuating section 259 preferably includes a center that is disposed at an offset distance OD2 relative to the center of the pivot member 270 (See FIG. 4). The predetermined offset distance OD2 preferably measures in a range of 15 to 25 mm.

The second arm 258 is then preferably configured to receive a holding force along a direction generally shown at F2. The holding force is preferably configured to cause the second arm 258 to rotate about the contact surface 272. The contact surface 272 is preferably configured to engage a sidewall within the housing 202, as discussed above, and thus be braced/wedged by the housing 202. The holding force may then be transferred to the first arm 256 and cause the same to be rotatably displaced. This rotation of the first arm 256 is preferably configured to indirectly supply the holding force from the actuator 255 to the valve 254. Preferably, this indirect application of the holding force causes the gaps (lash) in the mating part to be eliminated.

As further shown in the example of FIG. 3, the housing 202 can couple to a cylinder housing 248. Note, the cylinder housing 248 can be formed with the housing 202 as a single monolithic piece or as multiple pieces. The cylinder housing 248 can define a receiving chamber 261 that can be fluidly coupled to the inlet 244 via fluid pathway 260. A piston 252 can be disposed in the receiving chamber 261 and be coupled to a shaft 253. The shaft 253 can be implemented as the shaft 116 of FIG. 1. The piston 252 can be configured to translate linear movement along direction D1 into rotational movement of the shaft 253. This rotational movement may then be used for purposes of, for instance, conversion of waste heat into energy for use by other engine components/systems.

Figure 5:
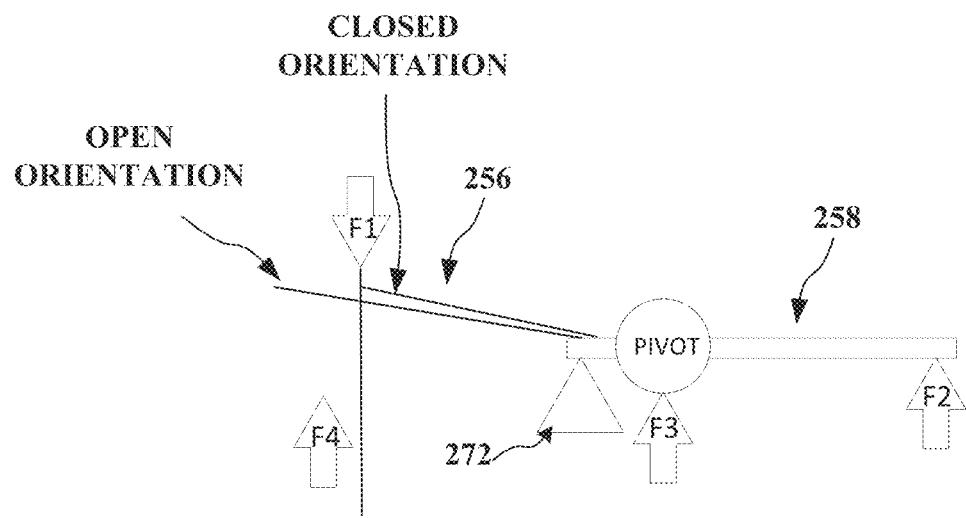
FIG. 5 is a block diagram illustrating an example principle of operation for a hydraulic lash assembly consistent with the present disclosure.

FIG. 5, with additional reference to FIG. 3, shows an example principle of operation for a hydraulic lash assembly consistent with the present disclosure. In operation, the first arm 256 can receive driving force F1 via the timing member 240 (see FIG. 3) and be displaced by the same to transition from the closed orientation to the open orientation. The distance between the closed orientation and the open orientation is preferably in a range of 2 to 4 mm, and more preferably greater than or equal to 3 mm.

In the open orientation, fluid and/or gas is preferably communicated via the fluid pathway 260 into the receiving chamber 261. Preferably, the fluid communicated via the fluid pathway 260 into the receiving chamber 261 is sCO2 having a pressure in a range of 3000 psi to 5000 psi and a temperature in a range of 600 F to 700 F. When the driving force ceases, e.g., the lobe 241 no longer engages the first arm 256 to open valve 254 further, the valve 254 can be displaced via a counter force F4 towards the closed orientation (e.g., based on the pressure of the fluid at the inlet 244 and/or based on a spring force). At or about the same time, the fluid and/or gas within the receiving chamber 261 expands to cause linear displacement/movement of the piston 252 along direction D1. In the context of the fluid within the receiving chamber 261 being sCO2, the expansion can be caused by the rapid increase in pressure caused by the sCO2 being disposed within the receiving chamber 261. In any event, the piston 252 may then cause rotation of the shaft 253 for purposes of energy recovery and use by other engine components.

In the closed orientation, the second arm 258 can receive a holding force F2, which may also be referred to herein as a lash actuator force or simply an actuator force. The holding force F2 can cause rotation of the second arm 258 about the contact surface 272 which can operate as a fulcrum. The pivot force F3 may then cause the first arm 256 to close the gaps (lash). For simplicity, the pivot force F3 may also be referred to herein as a holding force.

Accordingly, the first arm 256 is preferably configured to move independent of the second arm 258 to supply the driving force (e.g., received from the timing member 240) and transition the valve 254 from the closed orientation to the open orientation. In addition, the second arm 258 is preferably configured to act as a lever and displace the first arm 256 in a synchronized fashion to close the gaps (lash).

Accordingly, a hydraulic lash assembly consistent with the present disclosure can support a first arm (e.g., first arm 256) at a pivot point provided by a second arm (e.g., second arm 258). Preferably, a hydraulic actuator (e.g., the actuator 255) is disposed at an end of the second arm that is opposite the pivot point. By setting the lever ratio R of the second arm it is possible to multiply the effective hydraulic stiffness of the hydraulic actuator 255, as seen by the valvetrain at the pivot point provided by the second arm, by a factor of $R^2$. For example, if the lever ratio R is equal to 10, then the resulting effective hydraulic stiffness for the HLA is 100. Notably, this assumes that the lever arrangement provided by the first arm and the second arm is perfectly rigid. However, a hydraulic lash assembly consistent with the present disclosure effectively achieves sufficient rigidity based on factors such as the relatively short distance that the first arm travels in order to transition the valve between the open and closed orientation, as discussed above. In addition, the first and second arms can be configured with dimensions that further influence the resulting rigidity.

Figure 6:
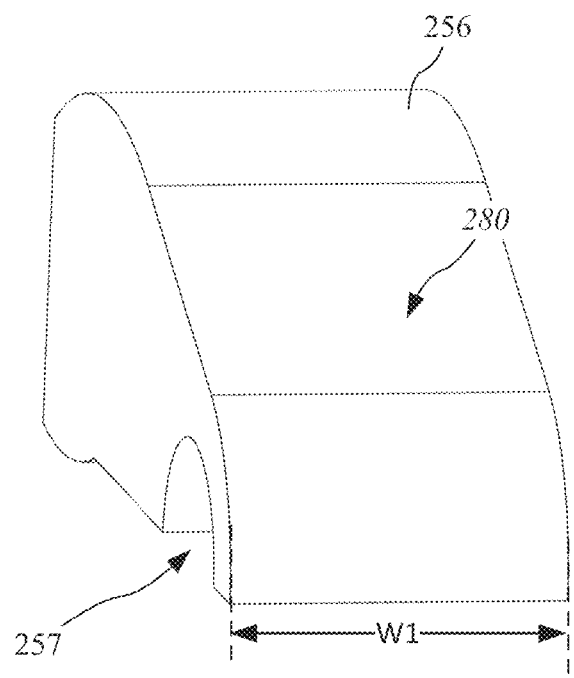
FIG. 6 is a perspective view of the first arm of the hydraulic lash assembly of FIG. 4.
Figure 7:
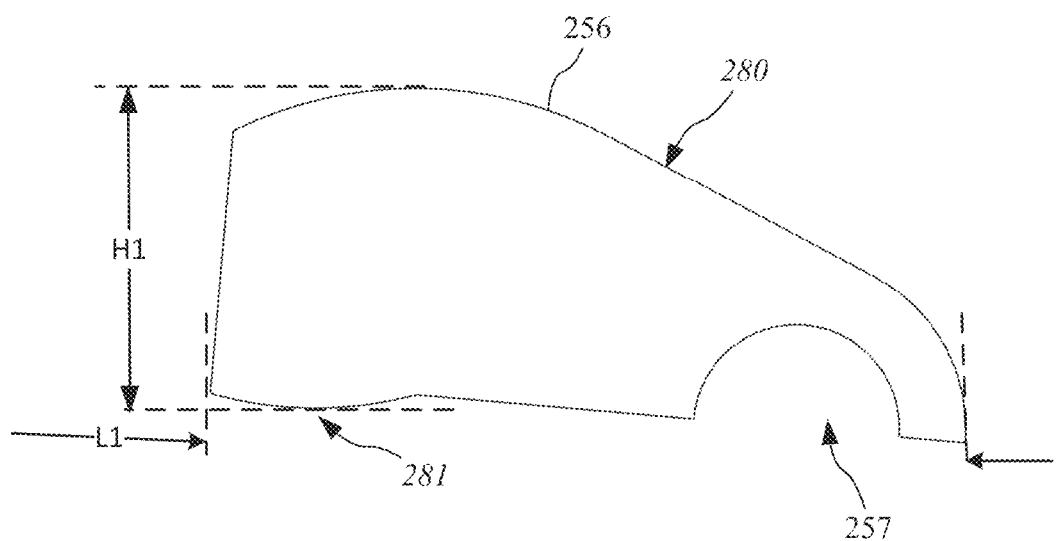
FIG. 7 is a side view of the first arm of the hydraulic lash assembly of FIG. 4.

FIGS. 6 and 7 show the first arm 256 of FIGS. 3-4 in isolation. As shown, the first arm 256 includes a first overall width W1. The first overall width W1 preferably measures in a range of 5 to 20 mm. The first arm 256 further preferably includes a first overall length L1. The first overall length L1 preferably measures in a range of 20 to 40 mm. The first arm 256 further preferably includes a first overall height H1. The first overall height H1 preferably measures in a range of 5 to 20 mm. As shown, the first arm 256 preferably includes a height that varies along the length of the first arm 256 to provide a taper. The first arm 256 further could include a uniform width (W1) along the entire length of the first arm 256.

Figure 8:
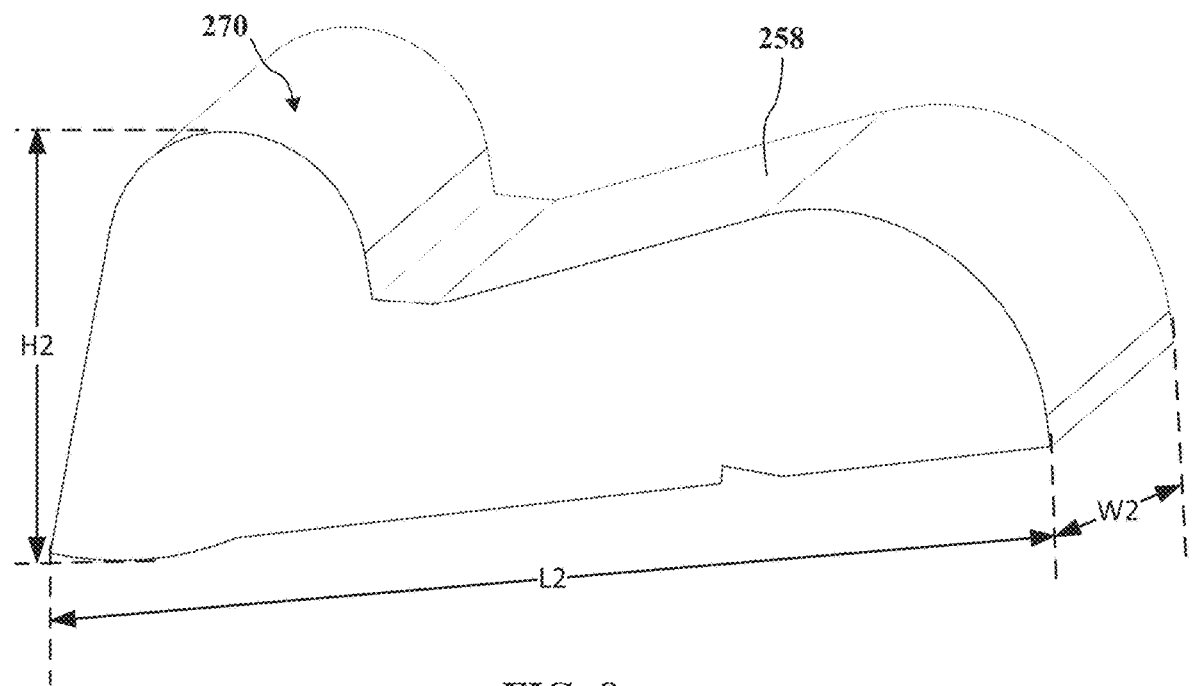
FIG. 8 is a perspective view of the second arm of the hydraulic lash assembly of FIG. 4.
Figure 9:
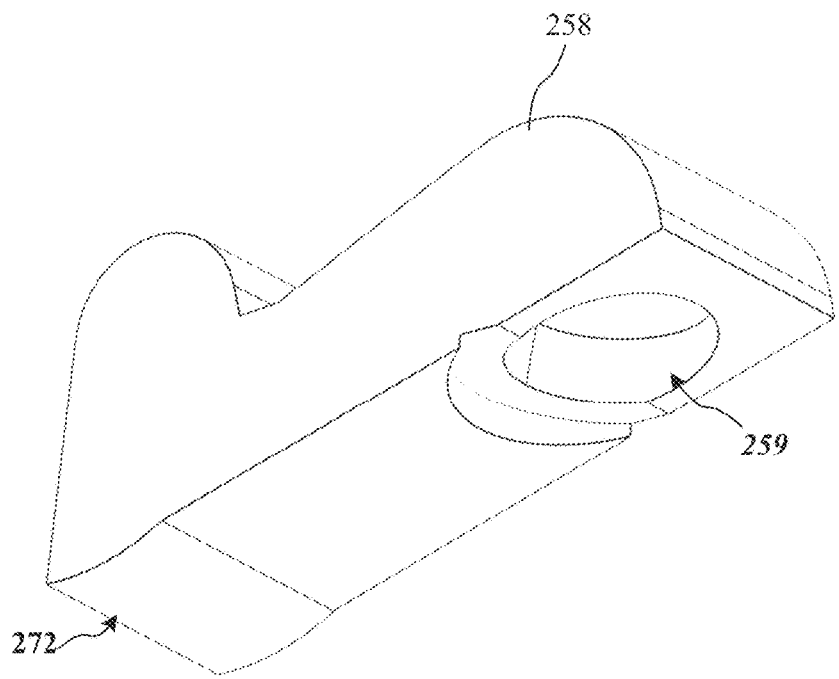
FIG. 9 is a side view of the second arm of the hydraulic lash assembly of FIG. 4.

FIGS. 8 and 9 show the second arm 258 of FIGS. 3-4 in isolation. As shown, the second arm 258 includes a second overall width W2. The second overall width W2 preferably measures in a range of 5 to 20 mm. The second arm 258 further preferably includes a second overall length L2. The second overall length L2 preferably measures in a range of 25 to 45 mm. The second arm 258 further preferably includes a second overall height H2. The second overall height H2 preferably measures in a range of 5 to 20 mm. As shown, the second arm 258 preferably includes a taper based on the pivot member 270. The pivot member 270 is preferably includes a rounded profile/shape that corresponds to the shape of the pivot joint 257 of the first arm 256 (see FIG. 4). The pivot member 270 is preferably configured to be at least partially inserted into the pivot joint 257 of the first arm 256 and form a friction fit.

As may now be appreciated from the disclosure herein, the hydraulic lash assembly herein provides a mechanism that is designed to close any clearances in the valvetrain whilst compensating for thermal expansion and manufacturing tolerances. Without these functions the durability and efficiency would suffer. Preferably, this mechanism provides relatively high enough stiffness to facilitate the relatively high forces needed for short valve opening events.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. It will be appreciated by a person skilled in the art that an apparatus may embody any one or more of the features contained herein and that the features may be used in any particular combination or sub-combination. Modifications and substitutions by one of ordinary skill in the art are considered to be within the scope of the present disclosure, which is not to be limited except by the claims.

What is claimed is:

1. A hydraulic lash assembly comprising:
a housing including:
a sidewall;
a first arm configured to transition a valve between a closed orientation and an open orientation, the first arm including an engagement surface configured to receive a driving force from a cam so as to cause the valve to transition to the open orientation for a predetermined period of time; and
a second arm configured to receive a holding force from an actuator, the second arm comprising:
a first end coupled to the actuator; and
a second end including a protruding pivot member coupled to the first arm so as to displace the first arm based on the holding force, and a contact surface configured to engage said sidewall,
wherein the first arm and the second arm form a lever arrangement in which the contact surface provides a fulcrum for the lever arrangement, and the protruding pivot member underlies and supports the first arm so as to enable rotational movement of the first arm independently from the second arm when transitioning the valve to the open orientation based on the driving force.

2. The hydraulic lash assembly of claim 1, wherein the first arm comprises a first material and the second arm comprises a second material.

3. The hydraulic lash assembly of claim 1, wherein the first arm is displaced a predetermined distance by the driving force when transitioning the valve from the closed orientation to the open orientation, the predetermined distance being at least 2 millimeters and at most 4 millimeters.

4. The hydraulic lash assembly of claim 1, wherein the predetermined period of time is at least 1 millisecond and at most 3 milliseconds.

5. The hydraulic lash assembly of claim 1, wherein the first arm further includes a pivot joint opening configured to receive at least a portion of the protruding pivot member so as to rotatably couple the first arm and the second arm to each other.

6. The hydraulic lash assembly of claim 1, wherein the first end of the second arm defines an actuating section, configured to receive the actuator so as to rotatably couple the second arm and the actuator to each other.

7. The hydraulic lash assembly of claim 6, wherein the actuator is a hydraulic actuator.

8. The hydraulic lash assembly of claim 1, wherein the driving force is at most 10000 Newtons.

9. The hydraulic lash assembly of claim 1, wherein the holding force is configured to maintain a zero amount of lash between the valve and the first arm.

10. An expander for use within a heat recovery system, the expander comprising:
a housing defining:
an inlet configured to receive a supercritical fluid; and
a receiving chamber configured to receive the supercritical fluid from the inlet;
a valve configured to transition between a closed orientation in which the inlet and the receiving chamber are fluidly decoupled, and an open orientation in which the inlet and the receiving chamber are fluidly coupled; and
a hydraulic lash assembly disposed in the housing, the hydraulic lash assembly comprising:
a first arm configured to transition the valve between the closed orientation and the open orientation, the first arm including an engagement surface configured to receive a driving force from a cam so as to cause the valve to transition to the open orientation for a predetermined period of time; and
a second arm configured to receive a holding force from an actuator, the second arm including a protruding pivot member coupled to the first arm so as to displace the first arm based on the holding force,
wherein the first arm and the second arm form a lever arrangement in which the protruding pivot member underlies and supports the first arm so as to enable rotational movement of the first arm independently from the second arm when transitioning the valve to the open orientation based on the driving.

11. The expander of claim 10, wherein the super critical fluid is super critical carbon dioxide.

12. The expander of claim 10, wherein the first arm comprises a first material and the second arm comprises a second material.

13. The expander of claim 10, wherein the first arm is displaced a predetermined distance by the driving force when transitioning the valve from the closed orientation to the open orientation, the predetermined distance being at least 2 millimeters and at most 4 millimeters.

14. The expander of claim 10, wherein the predetermined period of time is at least 1 millisecond and at most 3 milliseconds.

15. The expander of claim 14, wherein the actuator is a hydraulic actuator.

16. The expander of claim 10, wherein the driving force is at most 10000 Newtons.

17. The expander of claim 10, wherein the first arm further includes a pivot joint opening configured to receive at least a portion of the protruding pivot member so as to rotatably couple the first arm and the second arm to each other.

18. The expander of claim 10, further comprising:
a shaft; and
a piston disposed in the receiving chamber and coupled to the shaft,
wherein the supercritical fluid communicated into the receiving chamber displaces the piston so as to cause rotation of the shaft when the valve is in the open orientation.

* * * * *